United States Patent
Macnamara

(10) Patent No.: US 10,919,511 B2
(45) Date of Patent: Feb. 16, 2021

(54) SYSTEM AND METHOD FOR DETERMINING STATUS OF A BRAKE SPRING

(71) Applicant: Bendix Commercial Vehicle Systems LLC, Elyria, OH (US)

(72) Inventor: Joseph M Macnamara, Ashland, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 85 days.

(21) Appl. No.: 16/226,846

(22) Filed: Dec. 20, 2018

(65) Prior Publication Data
US 2020/0198614 A1  Jun. 25, 2020

(51) Int. Cl.
| | | |
|---|---|---|
| *B60T 17/22* | (2006.01) | |
| *G01D 5/16* | (2006.01) | |
| *B60T 13/38* | (2006.01) | |

(52) U.S. Cl.
CPC .............. *B60T 17/221* (2013.01); *G01D 5/16* (2013.01); *B60T 13/38* (2013.01)

(58) Field of Classification Search
CPC .......... B60T 17/221; B60T 13/38; G01D 5/16
USPC ...................................................... 324/76.11
See application file for complete search history.

(56) References Cited

U.S. PATENT DOCUMENTS

| | | | |
|---|---|---|---|
| 1,807,596 A | 6/1931 | Loughridge | |
| 2,582,886 A * | 1/1952 | Ruge .................... | G01L 1/2237 73/862.53 |
| 3,543,568 A * | 12/1970 | Russell ................. | G01L 1/2268 73/767 |
| 3,800,668 A | 4/1974 | Valentine | |
| 3,897,979 A | 8/1975 | Vangalis et al. | |
| 4,800,751 A * | 1/1989 | Kobayashi ........... | B60G 15/068 73/117.03 |
| 4,805,740 A | 2/1989 | Wilke et al. | |
| 5,559,286 A | 9/1996 | White et al. | |
| 5,791,441 A | 8/1998 | Matos et al. | |
| 5,803,211 A | 9/1998 | Wilke | |
| 5,847,290 A * | 12/1998 | Kim .................. | B60G 17/01933 73/862.641 |
| 5,872,319 A * | 2/1999 | Bruns ..................... | G01L 1/042 73/862.641 |
| 6,232,566 B1 * | 5/2001 | Bruns .................. | G01G 19/083 177/139 |

(Continued)

FOREIGN PATENT DOCUMENTS

| | | |
|---|---|---|
| CN | 102649424 A | 8/2012 |
| CN | 103979379 A | 8/2014 |
| DE | 102005041984 A1 | 3/2007 |

OTHER PUBLICATIONS

E65 Instrument Cluster, Oct. 2001, 67 pages.
Sensotronic Brake Control (W211 SBC), Sep. 30, 2002, 68 pages.

*Primary Examiner* — Christopher P McAndrew
(74) *Attorney, Agent, or Firm* — Brian Kondas; Cheryl Greenly; Eugene Clair

(57) ABSTRACT

A controller is adapted to output a predetermined input voltage signal across a Wheatstone bridge electrical circuit including a spring as a resistance in one leg of the Wheatstone bridge. The controller receives a response of a measured voltage across the Wheatstone bridge. The controller compares the predetermined input voltage with the measured voltage and determines a status of the spring based on the comparison.

18 Claims, 4 Drawing Sheets

(56) References Cited

U.S. PATENT DOCUMENTS

| | | | |
|---|---|---|---|
| 6,595,045 B1 | 7/2003 | Fuglewicz et al. | |
| 7,347,109 B2 * | 3/2008 | Yoshikuwa | G01G 3/1412 |
| | | | 73/862.474 |
| 7,401,506 B2 * | 7/2008 | Kunow | G01B 7/18 |
| | | | 73/161 |
| 7,712,588 B2 | 5/2010 | Caron | |
| 8,161,829 B2 * | 4/2012 | Zandman | G01L 1/2243 |
| | | | 73/862.622 |
| 10,444,091 B2 * | 10/2019 | Hu | G06F 3/0414 |
| 2005/0109090 A1 | 5/2005 | Pfeffer | |

* cited by examiner

SYSTEM AND METHOD FOR DETERMINING STATUS OF A BRAKE SPRING

BACKGROUND

The present invention relates to a vehicle park brake system. It finds particular application in conjunction with determining a status of a power spring in the park brake system and will be described with particular reference thereto. It will be appreciated, however, that the invention is also amenable to other applications.

Heavy vehicles commonly use pneumatic fluid for controlling braking systems. Service brakes are typically applied when compressed air enters a service brake chamber after a vehicle operator depresses a foot brake pedal. Parking brakes (e.g., emergency brakes), on the other hand, are applied when compressed air is exhausted from a parking brake chamber.

Each parking brake chamber includes a respective power spring, which is generally made from metal (e.g., steel). The power springs are compressed when the compressed air is introduced into the parking brake chamber and released when the compressed air is exhausted from the parking brake chamber to atmosphere. When compressed, the power spring does not engage to apply the parking brake. Conversely, when released (e.g., not compressed), the power spring engages to apply the parking brake.

Due to great forces exerted on the power spring while in the compressed position and as the power spring transitions between the compressed and release positions, the metal comprising the power spring fatigues over time. At some point, the fatigue becomes great enough that the power spring fractures. Once a fracture occurs, a risk exists that the broken power spring may cause damage to the parking brake chamber. For example, if the two ends at the fractured spring become dislodged, at least one of the fractured ends may puncture a diaphragm in the parking brake chamber. A punctured diaphragm may lead to leaks and ineffective spring brake power.

The present invention provides a new and improved apparatus and method for determining a status of the power spring in the park brake chamber.

SUMMARY

In one aspect of the present invention, it is contemplated that a controller is adapted to transmit a command to an electrical control device for causing the electrical control device to output a predetermined input voltage signal across a Wheatstone bridge electrical circuit including a spring as a resistance in one leg of the Wheatstone bridge. The controller receives a response from the electrical control device indicative of a measured voltage across the Wheatstone bridge. The controller compares the predetermined input voltage with the measured voltage and determines a status of the spring based on the comparison.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
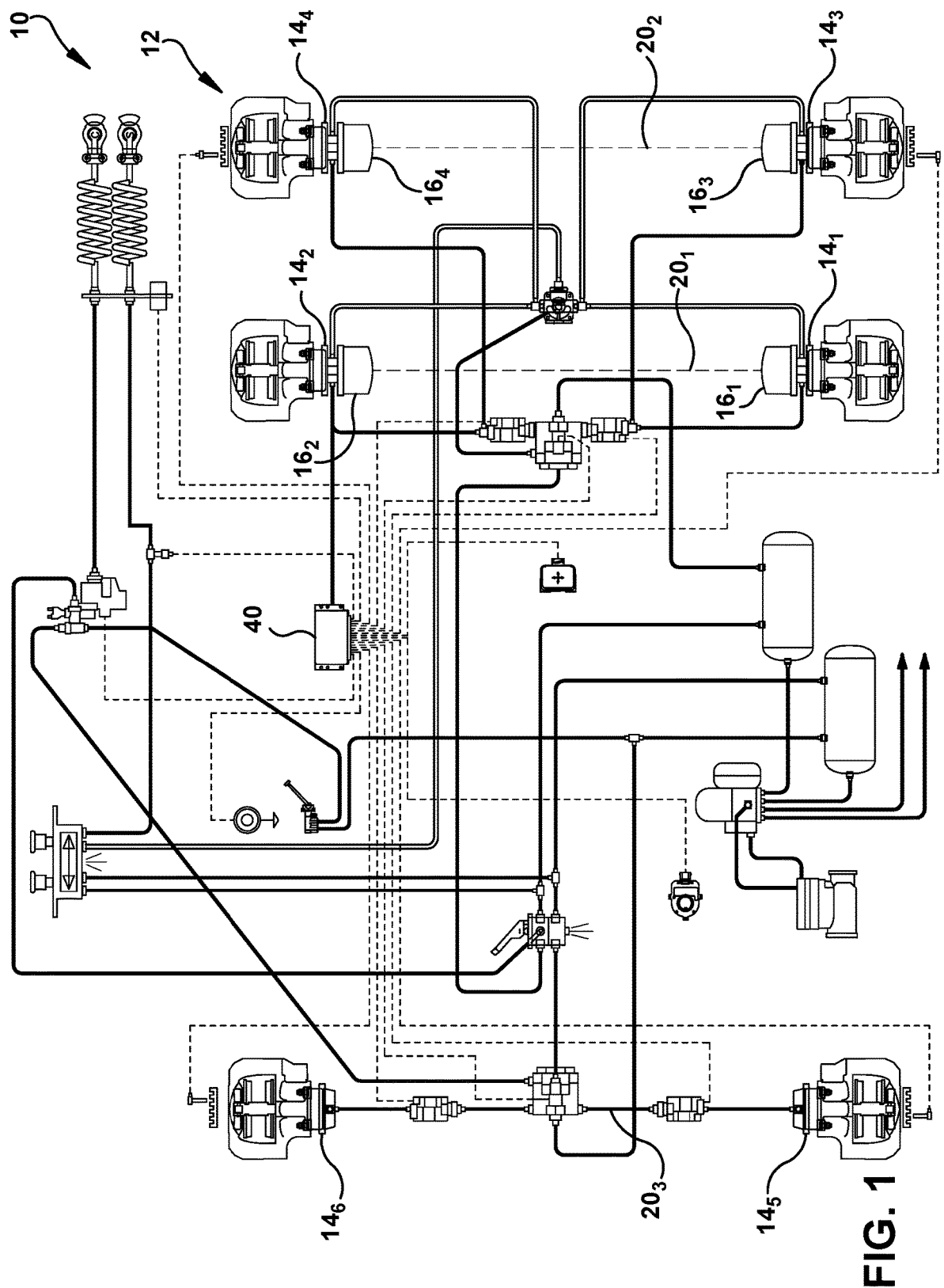
FIG. 1 illustrates a schematic representation of a vehicle in accordance with one embodiment of an apparatus illustrating principles of the present invention.

With reference to FIG. 1, a simplified component diagram of an exemplary vehicle 10 including a vehicle braking system 12 is illustrated in accordance with one embodiment of the present invention. The vehicle braking system 12 includes a service brake system, which includes at least one service brake chamber $14_{1,2,3,4,5,6}$ (collectively 14), and a park brake system, which includes at least one park brake chamber $16_{1,2,3,4}$ (collectively 16).

In the illustrated embodiment, the vehicle 10 includes three (3) axles $20_{1,2,3}$ (collectively 20) and six (6) wheels. Each of the wheels includes a respective one of the park brake chambers $16_{1,2,3,4}$. Each of the park brake chambers $16_{1,2,3,4}$ includes a respective power spring $24_{1,2,3,4}$ (collectively 24) (see FIG. 2). For ease of illustration, only the fourth power spring $24_4$ in the fourth park brake chamber $16_4$ is shown.

Figure 2:
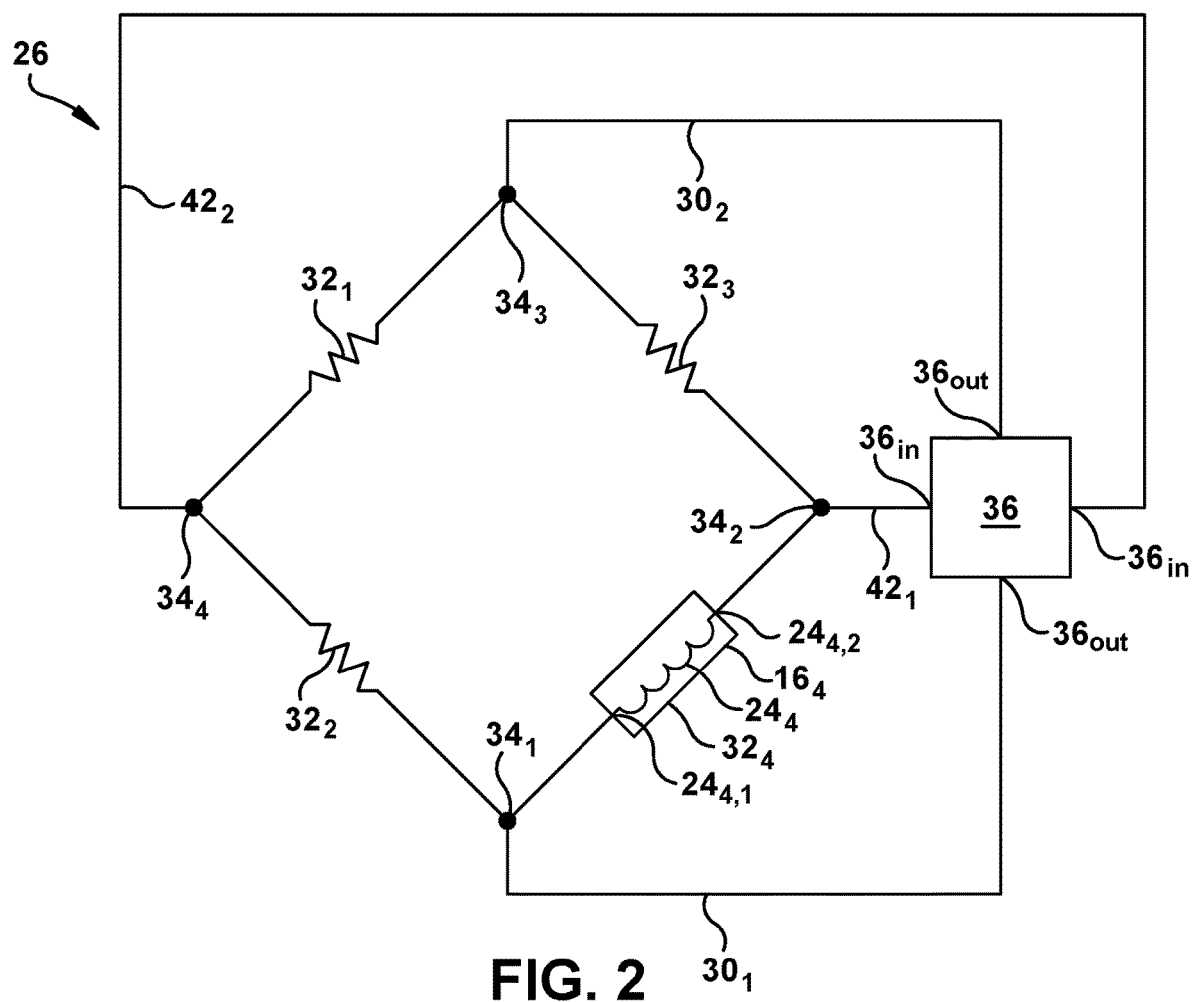
FIG. 2 illustrates a schematic representation of an electrical circuit in accordance with one embodiment of an apparatus illustrating principles of the present invention.

FIG. 2 illustrates the fourth power spring $24_4$, which is exemplary of all of the power springs 24, electrically incorporated into an electrical circuit 26. For example, the fourth power spring $24_4$ is electrically incorporated into a Wheatstone bridge circuit 26. As illustrated, the Wheatstone bridge circuit 26 includes four (4) resistive components $32_{1,2,3,4}$ (collectively 32) and four (4) electrical connections $34_{1,2,3,4}$. One (1) of the resistive components $32_4$ is the fourth power spring $24_4$. The remaining three (3) resistive components $32_{1,2,3}$ of the Wheatstone bridge 26 are known resistances.

With reference to FIGS. 1 and 2, the fourth power spring $24_4$ includes a first position $24_{4,1}$ and a second position $24_{4,2}$. In one embodiment, the first position $24_{4,1}$ is proximate a first end of the fourth power spring $24_4$, and the second position $24_{4,2}$ is proximate a second end of the fourth power spring $24_4$. The first position $24_{4,1}$ of the fourth power spring electrically acts as the first Wheatstone Bridge electrical connection $34_1$, and the second position $24_{4,2}$ of the fourth power spring $24_4$ electrically acts as the second Wheatstone bridge electrical connection $34_2$. Although only the fourth power spring $24_4$ is illustrated, it is to be understood that each of the power springs 24 includes a first position and a second position.

A first electrical connector $30_1$ is electrically connected at the first Wheatstone bridge electrical connection $34_1$ (e.g., the first position $24_{4,1}$ of the fourth power spring $24_4$), and a second electrical connector 302 is electrically connected at the third Wheatstone bridge electrical connection $34_3$. An electrical control device 36 (e.g., a controller) includes electrical outputs $36_{Out}$ and electrical inputs $36_{In}$. The electrical outputs $36_{Out}$ are electrically connected to the first and second electrical connectors $30_{1,2}$ (collectively 30). The electrical control device 36 is capable of transmitting (e.g., creating) an electrical voltage, via the electrical output $36_{Out}$, between the first and second electrical connectors $30_{1,2}$ and, consequently, the first and third Wheatstone bridge electrical connections $34_{1,3}$, respectively.

In one embodiment, the controller 36 is part of the vehicle braking system 12. However, other embodiments, in which the controller 36 is part of any other system (e.g., anti-lock braking system (ABS), adaptive cruise control with braking (ACB) system, electronic stability program (ESP) system, etc.) of the vehicle 10 are also contemplated. The controller 36 is adapted to control the electrical voltage created between the first and second electrical connectors $30_{1,2}$. In other words, the controller 36 creates a predetermined voltage (e.g., 5 Volts) between the first and second electrical connectors $30_{1,2}$ and, consequently, between the first and third Wheatstone bridge electrical connections $34_{1,3}$.

First and second electrical leads $42_{1,2}$ (collectively 42) are electrically connected to electrical inputs $36_{In}$ of the controller 36. The first lead $42_1$ is also electrically connected to the second Wheatstone bridge electrical connection $34_2$, and the second lead $42_2$ is also electrically connected to the fourth Wheatstone bridge electrical connection $34_4$. An output voltage between the second and fourth Wheatstone bridge electrical connections $34_{2,4}$, respectively, is measured by the first lead $42_1$ and the second lead $42_2$.

In this configuration of the electrical circuit 26 (e.g., the Wheatstone bridge 26), the expected calculated output voltage $V_{Out,Calc}$ (e.g., the electrical connection $34_2$ and the electrical connection $34_4$) is:

$$V_{Out,Calc} = ((R2/(R1+R2))-(R4/(R4+R3)))*V_{In}$$

Where: R1=Resistance of the first resistive component $32_1$;
R2=Resistance of the second resistive component $32_2$;
R3=Resistance of the third resistive component $32_3$;
R4=Resistance of the fourth resistive component $32_4$;
$V_{In}$=Input Voltage (e.g., predetermined Input Voltage between the electrical connection $34_1$ and the electrical connection $34_3$); and
$V_{Out,Calc}$=Expected Calculated Output Voltage.

If all four of the power springs $24_{1,2,3,4}$ are operating as expected (e.g., not compromised or severed), it is assumed R1=R2=R3=R4 zero (0). Therefore, $V_{Out,Calc}$ is substantially zero (0).

In one embodiment, if the power springs $24_{1,2,3,4}$ are operating as expected (e.g., not compromised or severed), it is assumed R1=R2=R3=R4=substantially zero (0). Therefore, $V_{Out,Calc}$ is approximated as $(0-0)*V_{In}$, or zero (0). It is assumed the resistance R4 increases as the fourth power spring $24_4$ becomes corroded. Therefore, if R1=R2=R3, and as R4 increases (e.g., as the fourth power spring $24_4$ corrodes), $V_{Out,Calc}$ becomes negative. If the fourth power spring $24_4$ becomes severed, the resistance R4 becomes large enough (e.g., an open circuit) that the measured output voltage $V_{out,Calc}$ becomes $-\frac{1}{2}V_{In}$ (i.e., negative $\frac{1}{2}V_{In}$).

The controller 36 receives response signals indicating the actual output voltage $V_{out,Act}$. The controller 36 monitors the actual output voltage $V_{out,Act}$ and determines a status of the power springs 24 based on the actual output voltage $V_{out,Act}$ as compared with the predetermined input voltage $V_{In}$.

In one embodiment, the controller 36 determines the status of the power spring (e.g., the fourth power spring $24_4$) is acceptable if the actual measured voltage $V_{out,Act}$ is about zero (0) (see above) and determines the power spring (e.g., the fourth power spring $24_4$) is unacceptable if the actual output voltage $V_{out,Act}$<0 (zero). In other embodiments, the controller 36 determines the power spring (e.g., the fourth power spring $24_4$) is compromised (e.g., corroded) if 0> $V_{out,Act}$>$-\frac{1}{2}V_{In}$ and that the power spring (e.g., the fourth power spring $24_4$) is severed if $V_{out,Act}=-\frac{1}{2}V_{In}$.

If the controller 36 determines the power spring (e.g., the fourth power spring $24_4$) is acceptable, no action is taken to notify an operator of the vehicle 10. Alternatively, it is also contemplated that a notification is periodically or continuously provided to alert the operator of the vehicle 10 that the status of the power spring (e.g., the fourth power spring $24_4$) is acceptable. The notification may be a visual notification (e.g., a light on a dashboard of the vehicle 10) that is illuminated as a predetermined color (e.g., green) if the status of the power spring (e.g., the fourth power spring $24_4$) is acceptable. The notification may also be an audible sound that can be heard by the operator of the vehicle 10.

If the controller 36 determines the status of the power spring (e.g., the fourth power spring $24_4$) is unacceptable, the controller 36 takes action to notify the operator of the vehicle 10. In one embodiment, the controller 36 transmits a notification signal for activating a notification to notify an operator of the vehicle 10 that the status of the spring is not acceptable. For example, the controller 36 transmits a notification signal to notify the operator of the vehicle 10 with a dash light that is illuminated a predetermined color (e.g., red) if the status of the power spring (e.g., the fourth power spring $24_4$) is unacceptable. It is also contemplated that the controller 36 notifies the operator of the vehicle 10 in one manner if the status of the power spring (e.g., the fourth power spring $24_4$) is compromised (e.g., corroded) and in another manner if the status of the power spring (e.g., the fourth power spring $24_4$) is severed (e.g., broken). For example, the controller 36 may cause a dash light to illuminate in a first predetermined color (e.g., orange) if the power spring (e.g., the fourth power spring $24_4$) is compromised and illuminate in a second predetermined color (e.g., red) if power spring (e.g., the fourth power spring $24_4$) is severed. It is also contemplated that the controller 36 may cause a dash light to illuminate continuously in a predetermined color (e.g., red) if the power spring (e.g., the fourth power spring $24_4$) is compromised and illuminate in a blinking manner in the same predetermined color (e.g., red) if power spring (e.g., the fourth power spring $24_4$) is severed.

Other embodiments are also contemplated in which each of the power springs 24 is electrically incorporated into respective electrical circuits and respective notifications for each of the power springs 24 are provided to the vehicle operator.

Although the embodiment discussed above discloses the electrical circuit 26 as a Wheatstone bridge 26, other electrical circuits are also contemplated. For example, the electrical control device 36 may directly measure the electrical resistance through the power springs 24 (e.g., without the power springs 24 being included in an electrical circuit such as a Wheatstone bridge).

Figure 3:
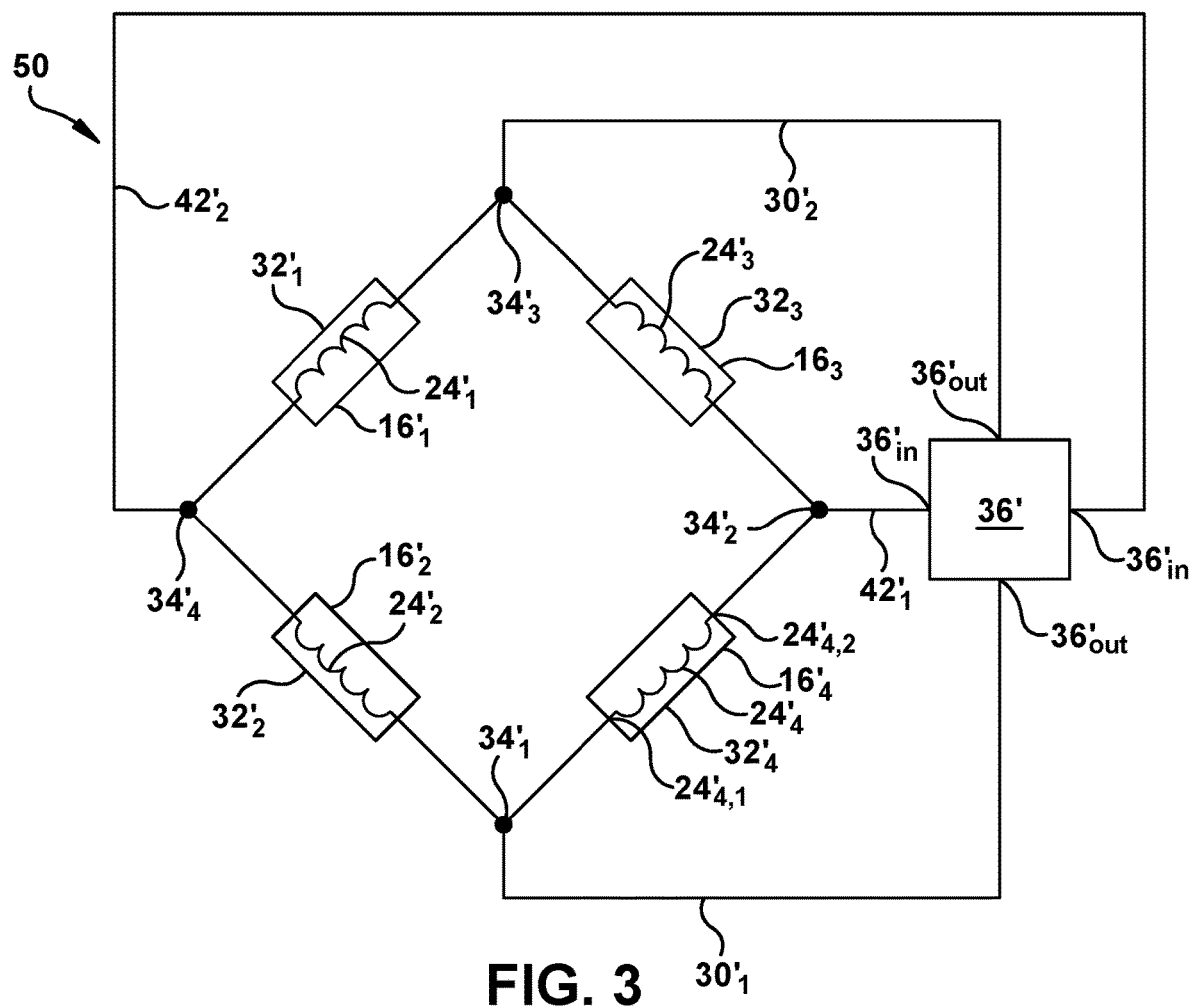
FIG. 3 illustrates a schematic representation of an electrical circuit in accordance with a second embodiment of an apparatus illustrating principles of the present invention.

With reference to FIG. 3, another embodiment of the present invention is illustrated. For ease of understanding this embodiment of the present invention, like components are designated by like numerals with a primed (') suffix and new components are designated by new numerals. In the embodiment illustrated in FIG. 3, each of the four (4) power springs $24'_{1,2,3,4}$ is electrically connected as respective resistive components $32'_{1,2,3,4}$ in a leg of the electrical circuit 50 (e.g., the Wheatstone bridge 50). In this embodiment, if the status of each of the power springs $24'_{1,2,3,4}$ is acceptable, the resistance through each of the power springs $24'_{1,2,3,4}$ is slightly greater than zero (0) and, consequently, $V_{out}$ is substantially zero (0). If any of the power springs $24'_{1,2,3,4}$ becomes compromised (e.g., corroded), $V_{out,Act}$ changes (e.g., increases or decreases), and if any of the power springs $24'_{1,2,3,4}$ becomes severed, $V_{out,Act}$ increases (or decreases) above a predetermined threshold voltage (e.g., $-\frac{1}{2} V_{In}$).

Figure 4:
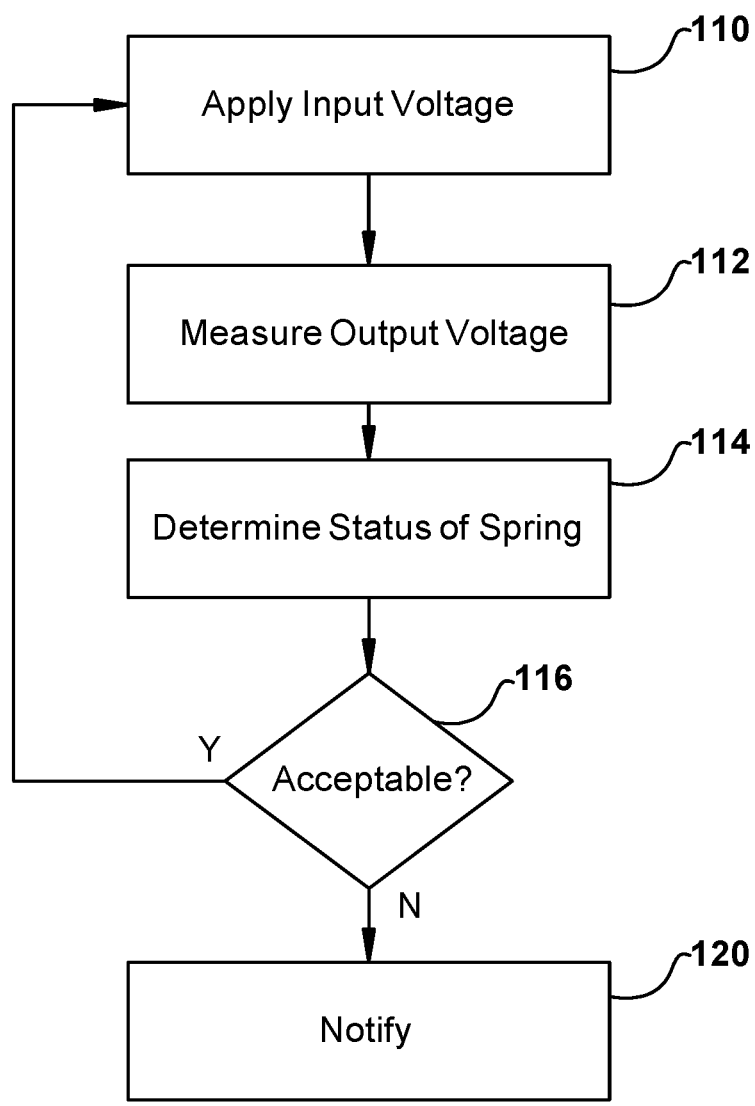
FIG. 4 is an exemplary methodology of determining a status of a spring in a park brake chamber in accordance with one embodiment illustrating principles of the present invention.

With reference to FIG. 4, an exemplary methodology of the system shown in FIGS. 1-3 for determining a status of a spring is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-4, the predetermined voltage is transmitted from the electrical control device 36, 36' (e.g., controller) and applied to the circuit 26, 50 via the electrical connectors 30, 30' in a step 110. The voltage is received by the electrical control device 36, 36' from the electrical leads 42, 42' in a step 112. The controller 36 determines the status of the spring 24 in a step 114.

A determination is made by the controller 36 in a step 116 whether the status of the spring 24 is acceptable. If the status of the spring 24 is acceptable, control returns to the step 110. Otherwise, if the status of the spring 24 is not acceptable, control passes to a step 120 for transmitting a signal from the controller 36 to activate a notification.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller, the controller being adapted to:
   output a predetermined input voltage signal across a Wheatstone bridge electrical circuit including a spring and an additional predetermined fixed resistance in series as a resistance in one leg of the Wheatstone bridge;
   receive a response indicative of a measured voltage across the Wheatstone bridge;
   compare the measured voltage to one of a plurality of previously determined voltages based on the predetermined fixed resistance; and
   determine a status of the spring as severed if the response indicates the measured voltage is about one-half of an absolute value of the predetermined input voltage.

2. The controller as set forth in claim 1, wherein the controller is further adapted to:
   if respective resistances in the remaining three legs of the Wheatstone bridge electrical circuit are substantially equal, determine the status of the spring as acceptable if the response indicates the measured voltage is substantially zero (0) volts.

3. The controller as set forth in claim 2, wherein the controller is further adapted to:
   determine the status of the spring as compromised if the response indicates measured voltage is not equal to zero (0) volts and less than about one-half of an absolute value of the predetermined input voltage.

4. The controller as set forth in claim 1, wherein the controller is further adapted to:
   transmit a command to the electrical control device for outputting the predetermined voltage of about 5 Volts.

5. The controller as set forth in claim 1, wherein the controller is further adapted to:
   if respective resistances in the remaining three legs of the Wheatstone bridge electrical circuit are three other springs, determine that at least one of the springs is compromised if the measured voltage one of increases and decreases beyond a predetermined threshold voltage.

6. The controller as set forth in claim 1, wherein the controller is further adapted to:
   transmit a notification signal for activating a notification to notify an operator of an associated vehicle if the status of the spring is not acceptable.

7. A vehicle system, the system comprising:
   a vehicle braking system including a park brake chamber;
   a power spring, included in the park brake chamber, in one leg of a Wheatstone bridge electrical circuit;
   a first electrical connector electrically connected at a first position of the Wheatstone bridge electrical circuit;
   a second electrical connector electrically connected at a second position of the Wheatstone bridge electrical circuit;
   an electrical control device for transmitting an electrical voltage between the first and second electrical connectors, the electrical control device being adapted to:
      output a predetermined input voltage signal between the first and second electrical connectors;
      receive a response signal indicative of a measured voltage across the Wheatstone bridge;
      compare the predetermined input voltage with the measured voltage; and
      determine a status of the power spring based on the comparison.

8. The vehicle system as set forth in claim 7, wherein the controller is further adapted to:
   if respective resistances in the remaining three legs of the Wheatstone bridge electrical circuit are substantially equal, determine the status of the power spring as unacceptable if the response signal indicates the measured voltage is less than about one-half an absolute value of the predetermined input voltage.

9. The vehicle system as set forth in claim 8, wherein the controller is further adapted to:
   determine the status of the power spring as severed if the response indicates the measured voltage is about one-half an absolute value of the predetermined input voltage.

10. The vehicle system as set forth in claim 7, the system further including:
   a second park brake chamber, a third park brake chamber, and a fourth park brake chamber included in the vehicle braking system;
   a second power spring, included in the second park brake chamber, in a second leg of the Wheatstone bridge electrical circuit;
   a third power spring, included in the third park brake chamber, in a third leg of the Wheatstone bridge electrical circuit; and a fourth power spring, included in the fourth park brake chamber, in a fourth leg of the Wheatstone bridge electrical circuit.

11. The vehicle system as set forth in claim 10, wherein: the controller determines a status of at least one of the power springs based on the comparison.

12. A method for determining a status of a spring in a leg of a Wheatstone bridge electrical circuit, the method comprising:
applying a predetermined input voltage across the Wheatstone bridge electrical circuit;
measuring an output voltage across the Wheatstone bridge electrical circuit;
comparing the predetermined input voltage with the measured output voltage; and
determining a status of the spring as severed if the comparison indicates the measured output voltage is about one-half of an absolute value of the predetermined input voltage.

13. The method as set forth in claim 12, further including:
if respective resistances in the remaining three legs of the Wheatstone bridge electrical circuit are substantially equal, determining the status of the spring as unacceptable if the comparison indicates the measured output voltage is less than about one-half of an absolute value of the predetermined input voltage.

14. The method as set forth in claim 12, further including:
transmitting a command to the electrical control device for applying the predetermined input voltage of about 5 Volts.

15. The method as set forth in claim 12, further including:
transmitting a notification signal to activate a notification to an operator of an associated vehicle if the status of the spring is not acceptable.

16. A controller, the controller being adapted to:
output a predetermined voltage signal across an electrical circuit including a plurality of power springs as respective resistive components of the electrical circuit;
output a predetermined voltage signal across the electrical circuit;
receive a response indicative of a measured voltage across the electrical circuit;
compare the predetermined voltage with the measured voltage; and
determine a status of at least one of the plurality of the power springs as severed if the comparison of the predetermined voltage with the measured voltage indicates an open circuit in the electrical circuit.

17. The controller as set forth in claim 16, wherein the controller is further adapted to:
determine the status of any of the power springs as compromised if the response indicates the measured voltage is within a predetermined threshold range of the predetermined voltage signal.

18. The controller as set forth in claim 16, wherein the controller is further adapted to:
if the status of any of the power springs is determined to be severed, transmit a notification signal to an operator of an associated vehicle.

* * * * *